Figure 1:
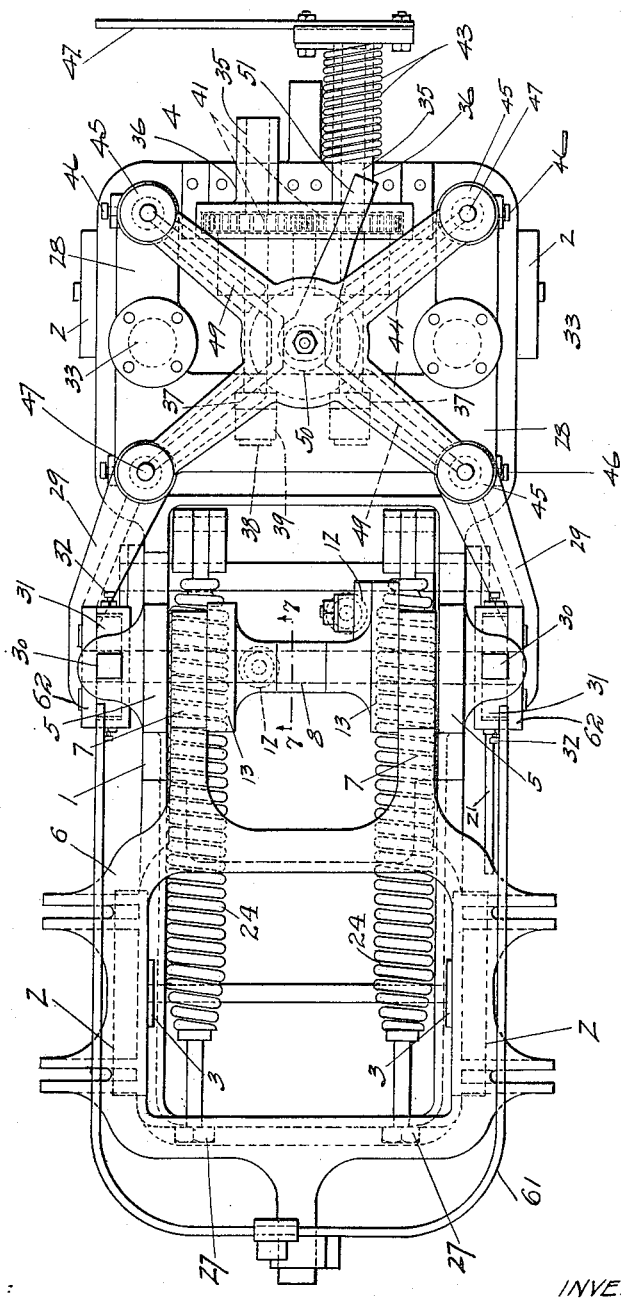

G. A. McKEEL.
MOLD MAKING MACHINE.
APPLICATION FILED DEC. 2, 1910.

1,145,203.

Patented July 6, 1915.
6 SHEETS—SHEET 1.

WITNESSES:

INVENTOR
George A. McKeel
BY
J. B. Fay
ATTORNEY

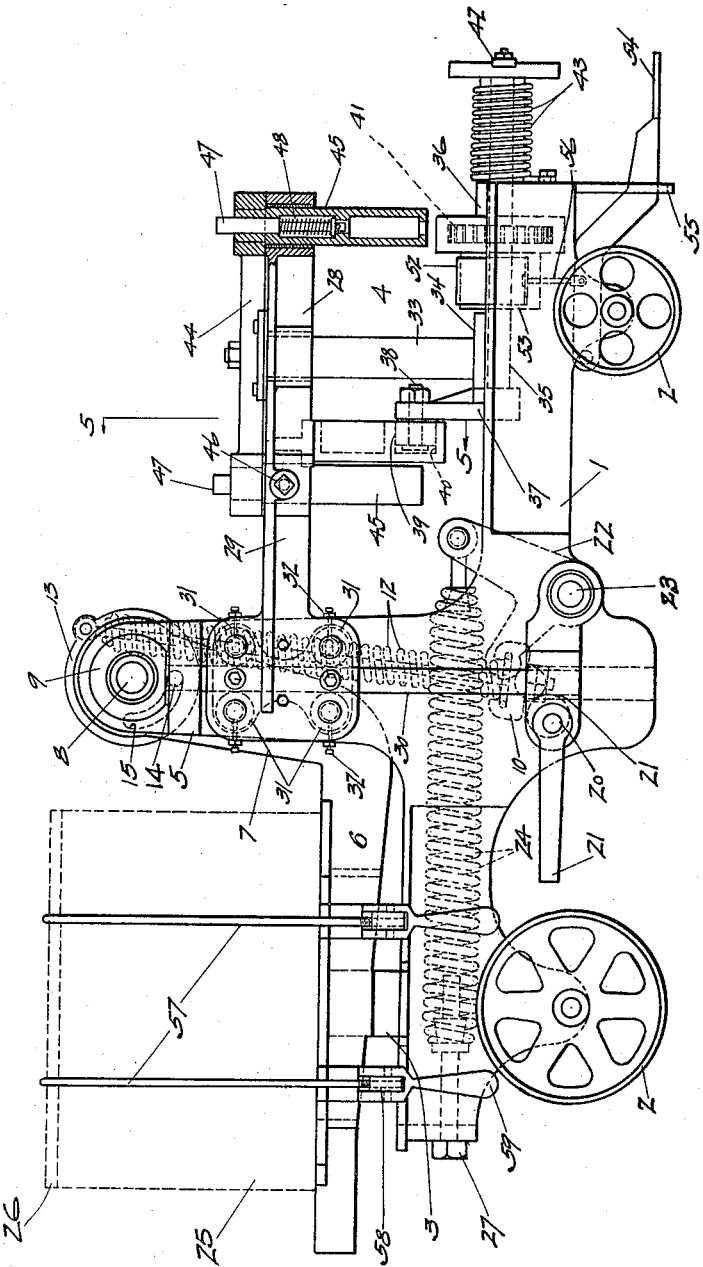

G. A. McKEEL.
MOLD MAKING MACHINE.
APPLICATION FILED DEC. 2, 1910.
1,145,203.
Patented July 6, 1915.
6 SHEETS—SHEET 3.
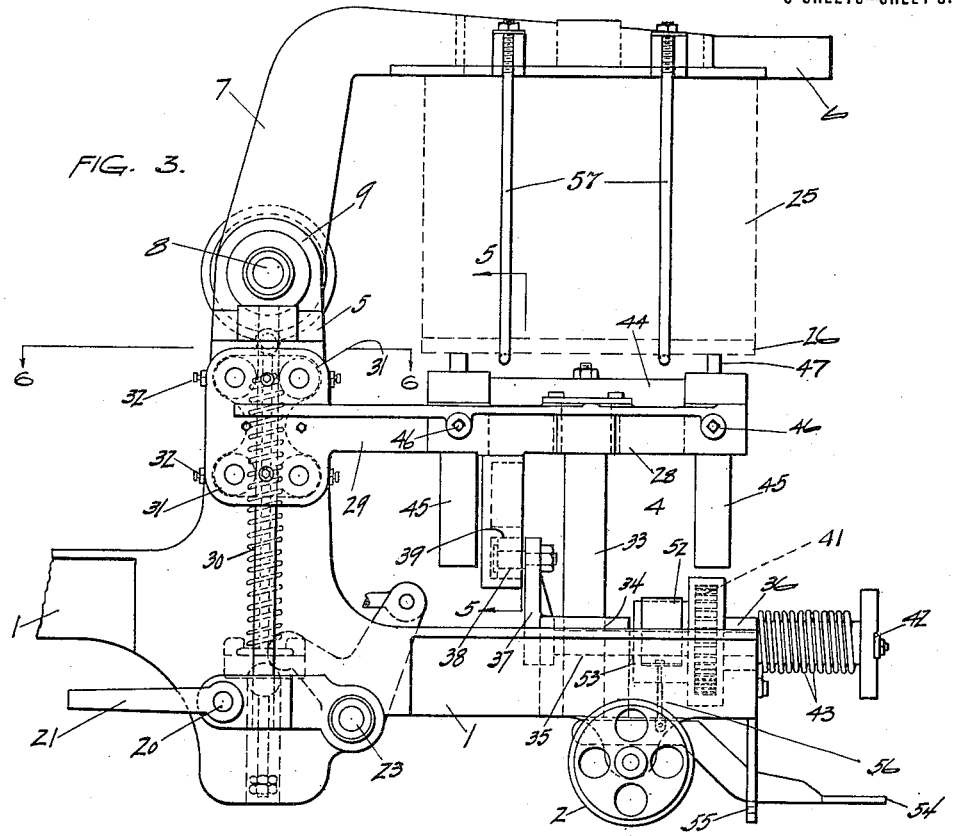
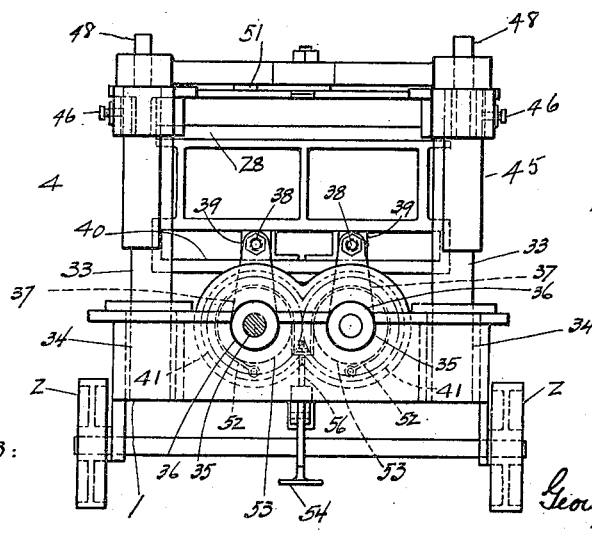
WITNESSES:
INVENTOR
George A. McKeel
BY J. B. Fay
ATTORNEY G. A. McKEEL.
MOLD MAKING MACHINE.
APPLICATION FILED DEC. 2, 1910.

1,145,203.

Patented July 6, 1915.
6 SHEETS—SHEET 4.

WITNESSES:

INVENTOR
George A. McKeel
BY
J. B. Fay
ATTORNEY

G. A. McKEEL.
MOLD MAKING MACHINE.
APPLICATION FILED DEC. 2, 1910.

1,145,203.

Patented July 6, 1915.
6 SHEETS—SHEET 5.

WITNESSES:

INVENTOR
George A. McKeel
BY
J. B. Fay
ATTORNEY

G. A. McKEEL.
MOLD MAKING MACHINE.
APPLICATION FILED DEC. 2, 1910.

1,145,203.

Patented July 6, 1915.
6 SHEETS—SHEET 6.

WITNESSES:
Oliver M. Kappler
H B Fay

INVENTOR
George A. McKeel
BY J. B. Fay
ATTORNEY

UNITED STATES PATENT OFFICE.

GEORGE A. McKEEL, OF CLEVELAND, OHIO, ASSIGNOR TO THE OSBORN MANUFACTURING COMPANY, OF CLEVELAND, OHIO, A CORPORATION OF OHIO.

MOLD-MAKING MACHINE.

1,145,203.　　　　Specification of Letters Patent.　　Patented July 6, 1915.

Application filed December 2, 1910. Serial No. 595,173.

*To all whom it may concern:*

Be it known that I, GEORGE A. McKEEL, a citizen of the United States, and a resident of Cleveland, county of Cuyahoga, and State of Ohio, have invented a new and useful Improvement in Mold-Making Machines, of which the following is a specification, the principle of the invention being herein explained and the best mode in which I have contemplated applying that principle, so as to distinguish it from other inventions.

The type of mold-making machines to which the present improvements pertain is that known to the trade as the rock-over machine. Such type is characterized by having an oscillatory carrier, or holder for the pattern plate so that the mold may be filled in one horizontal position of said carrier and then turned over in reverse position upon a suitable parting stand. This parting stand is vertically reciprocable in the usual construction, so as to draw the mold away from the pattern. In the type of machine referred to, furthermore, it is customary to employ resilient means generally in the form of tension springs connected to such oscillatory pattern carrier, whereby the movement of the latter may be facilitated, it being obvious that a considerable weight is attached thereto in the filled condition of the mold.

The object of the present invention is to provide a machine of the general type above referred to, which may be readily adjusted to the handling of molds, that is of flasks in which the molds are formed, of different depths; as also to provide a construction of resilient means of sufficient tension to afford the necessary assistance in rocking over the pattern carrier without interfering with the maintaining of the same in its filling position before the load of sand constituting the mold has been connected thereto or in its parting position after the mold has been detached therefrom.

The annexed drawings and the following description set forth in detail certain mechanism embodying the invention, such disclosed means constituting, however, but one of various mechanical forms in which the principle of the invention may be used.

Figure 5:
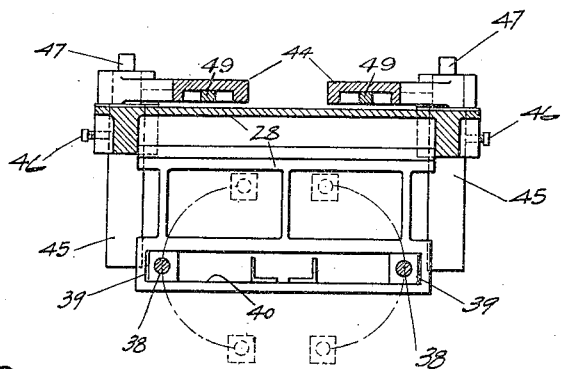
Figure 12:
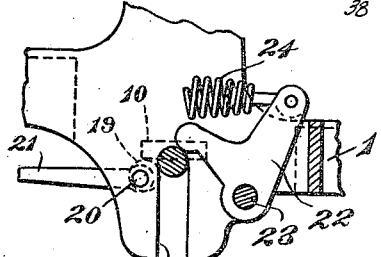
Figure 6:
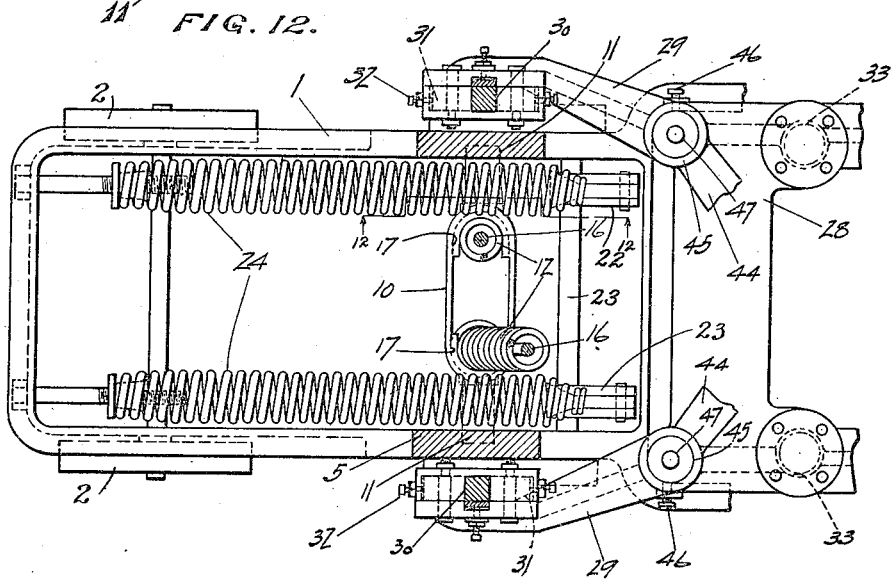
Figure 8:
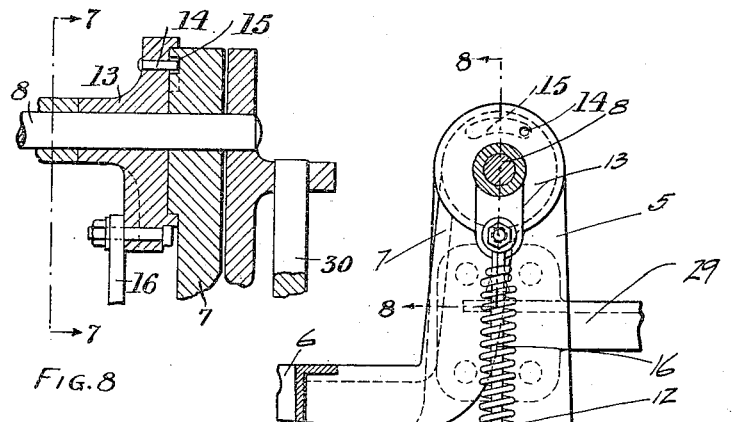
Figure 7:
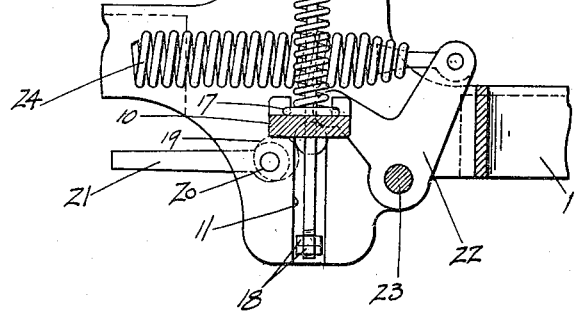
Figure 9:
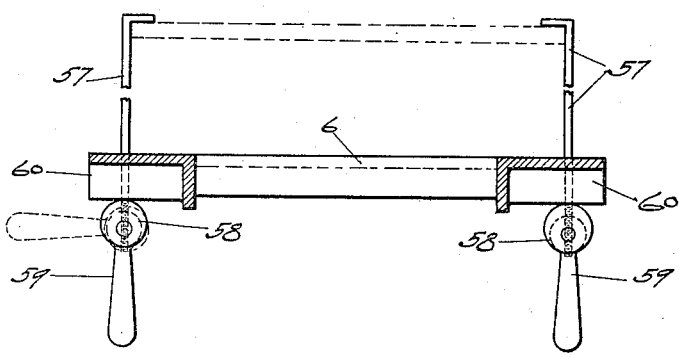
Figure 10:
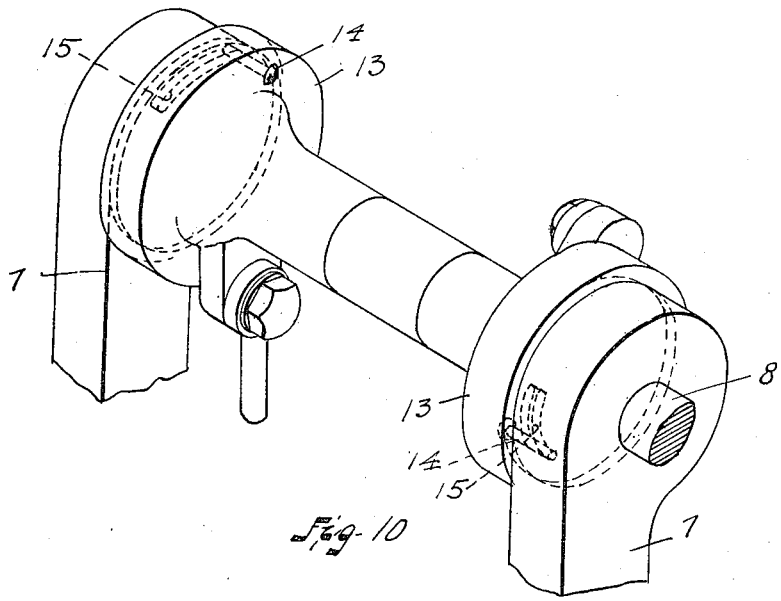
Figure 11:
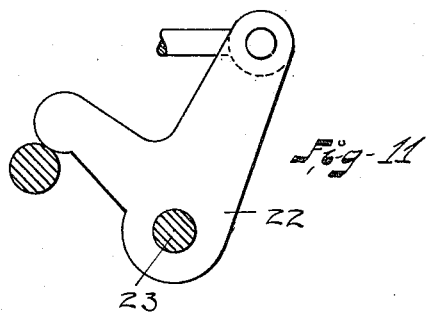

In said annexed drawings: Figure 1 is a plan view of a mold-making machine embodying my present improvements; Fig. 2 is a side elevational view of the same; Fig. 3 is a broken side elevation corresponding with Fig. 2, but showing certain parts in a different operative position and also illustrating a modified form of clamping means for securing the flask to the carrier; Fig. 4 is a front elevational view of the parting stand; Fig. 5 is a sectional view of such stand taken on the line 5—5, Figs. 2 and 3; Fig. 6 is a sectional detail taken on the line 6—6, Fig. 3; Fig. 7 is another sectional detail taken on the line 7—7 Fig. 1; Fig. 8 is a sectional view at right angles to the section of Fig. 7, as indicated by the line 8—8 on said figure; Fig. 9 illustrates an improved construction of clamping means for securing the mold or flask onto the pattern carrier; Fig. 10 is a view in perspective, showing the relative position of certain elements of the mechanism; Fig. 11 is a side elevation (partially in section) showing the engagement between certain other elements to be hereinafter described; and Fig. 12 is a sectional view of the cross-head and bell-crank lever taken on the line 12—12 Fig. 6.

The frame 1 of my present improved machine is of general elongated form and is preferably mounted on low wheels or rollers 2 to permit of its movement about. Said frame carries the filling and parting stands 3 and 4 above referred to, as also two laterally spaced standards 5 integral or rigid with such frame located intermediately between said stands and oscillatorily supporting the carrier or pattern plate holder 6. This carrier comprises an open frame of the general form illustrated in Fig. 1, such frame terminating at its inner end in two arms 7 extending at substantially right angles thereto, which arms are rigidly secured upon a shaft 8 that is journaled in suitable bearings 9 provided in the upper ends of the respective standards 5 and thus constituting the means whereby the frame is oscillatorily mounted on the latter, as just described above. Oscillation of such shaft and thus of the carrier frame is assisted, or effected, as the case may be, through the action of certain resilient means now to be described.

These means comprise in the first place a transversely disposed cross-head 10, the ends of which are slidably held in vertically extending slots or grooves 11 in the respective standards 5, so as to permit of vertical reciprocation on the part of said cross-head. The latter is resiliently connected with the shaft by means of two springs 12, the details of such connection being illustrated in Figs. 7 and 8. As shown in said figures, the upper ends of the respective springs are connected to disks 13 mounted upon the shaft 8, to which is attached the carrier frame, the points of attachment of the two springs in the normal position of the frame illustrated in Fig. 2 lying on opposite sides of said shaft, and approximately 180 degrees apart as will be seen upon a comparison of Figs. 2, 7 and 8, which respectively illustrate the springs at the bottom and top of the plan view in Fig. 1. The aforesaid disks have a limited rotative movement about the shaft, the range of such movement being determined by the engagement of a pin 14 carried by each disk and playing within a segmental slot 15 in the opposite face of the carrier arm 7 adjacent to which said disk is mounted. The disposition of these pins and slots, it will accordingly, be seen, determines when the respective springs will be put under tension and when such tension will be relieved. Thus in the normal position illustrated in Figs. 1 and 2, the right hand spring is in a state of tension by reason of the angular position of the disk, to which it is attached, about the carrier shaft. Upon the latter being rotated through an angle of 180 degrees into the position of Fig. 3, the tension of such spring will be relieved incidentally to the movement of its upper end into the position shown in Fig. 3, but the other spring, which lay idle in the first position, is now brought into play, and under tension, as will be readily understood. A limit is put upon the resilient action of said springs by the rods 16 which form supports therefor respectively and provide as well for the attachment of their upper ends to the corresponding disks. The lower ends of these rods, however, play freely within the spring, as also relatively to the cross-head 10, to which the lower ends of said springs are directly attached, suitable recessed pockets 17 being formed in such cross-head for this purpose. A nut 18 on the lower end of each rod permits of adjustment in the matter of its engagement with the cross-head, following which further elongation of the spring is stopped. In other words, when such nut is brought into contact with the cross-head, the rod forms in effect a direct link connection between the cross-head and the disk upon the carrier shaft, which obviously figures as a lever arm.

Reciprocable movement of the cross-head 10 in the vertical guides 11 provided therefor in the frame of the machine is controlled in a downward direction by means of a latch consisting simply of a cam-disk 19 carried by a rock shaft 20, which is provided with a handle 21 to facilitate its oscillation. In the position of this latch shown in Fig. 1, it will be seen that the cross-head is securely held against downward movement. Upward movement of such cross-head is at the same time controlled by the engagement therewith of the arms of a pair of rockers 22 mounted on a rock-shaft 23 that is journaled in the machine frame somewhat forwardly of the guideways 11 in which the cross-head is held. Connected with other lever arms conveniently made integral with the rockers just described, are too heavy, tension springs 24 horizontally disposed in that portion of the general machine frame over which the pattern carrier extends in its filling position. These springs 24 are arranged to be under maximum tension in the position of the rockers corresponding with the raised position of the cross-head, and illustrated in Fig. 2; but such tension is relieved by withdrawing the latch 19 that restrains downward movement of the cross-head, following which withdrawal the rockers are operated to force the cross-head down.

The mode of operation of the machine as thus far described, may now be conveniently explained. The flask 25 having been placed in position upon the carrier frame, as the latter rests upon the filling stand 3 in its normal position illustrated in Fig. 2, is filled with sand, the latter being tamped down in the usual fashion; the bottom board 26 of the mold is then placed over the flask and the whole clamped onto the carrier by suitable means which may take on a variety of forms, a preferred construction being hereinafter later described. The tension of the particular spring 12 that is operative in this position of the carrier is adjusted so as to approximately balance said carrier frame, or in other words, so as to relieve its dead weight. The heavier, operating springs 24, as they may be termed, are retained inactive during this filling operation by the latch previously described. When the filling is completed, however, and the carrier ready to be rocked over into parting position, such latch is raised and said springs 24 then allowed to come into play; with the result that the carrier and the filled mold are swung around, or at least material assistance is afforded in such swinging, depending, of course, upon the strength of the springs employed. The latter can be furthermore adjusted by means of set-bolts 27, so as to provide for a variable weight in the mold, depending upon the character of the latter, e. g. its depth, the amount of sand utilized therein, etc. The springs 12 are thus seen to act merely to distribute the weight of the carrier and the filled mold over the machine, and by counterbalancing this weight when in the position shown in Fig. 2, make it possible for the heavier springs 24 to supply substantially enough force to swing the carrier and filled mold to the vertical position with but little assistance from the operator.

The mold thus presented in reverse position is received upon the parting stand, the details of the construction of which will next receive attention, and is there deposited by releasing the clamping means that had secured it to the carrier frame. Before thus releasing the mold however, the latch is again thrown so as to prevent the depression of the cross-head 10, under the action of the springs 24, when the carrier is relieved of the weight of the mold. Such carrier is accordingly affected only by the counterbalancing tension of the other spring 12. This tension is not sufficient to jerk the pattern away from the mold, which might seriously damage the latter, although it is ample to render the operator's task in returning the carrier to its normal position a comparatively light one. The operating springs 24 are left under tension pending such return, so as to be available to swing over the carrier with its next load.

Turning next to the details of construction of the parting stand 4, the latter will be seen to comprise a top 28 that is carried by two bracket-like arms 29 respectively slidably attached to heavy guide rods 30, one on each side of the standards 5 which support the carrier shaft 8. These rods are preferably square in cross section, and movement of the table-supporting arms thereon is facilitated by the employment of rollers 31, which bear against the rear and forward face of the rods respectively. The bearings of such rollers permit of transverse adjustment, which is effected by means of set-screws 32 that engage with the rollers in a readily understandable fashion. Said parting stand top 28 is further steadied in its movement by means of two vertical plungers 33, centrally attached thereto and slidably fitting in appropriately formed bearings 34 in the machine base. Such movement may be secured, of course, by any suitable operative means, but I preferably employ a modified form of the mechanism shown in United States Letters Patent No. 982,971, issued to me January 31, 1911. The present mechanism comprises two inter-geared operating shafts 35 journaled in suitable bearings 36 provided therefor in the machine frame, such shafts preferably extending longitudinally of the latter and being located between the two plungers 33 that guide the vertical movement of the stand's top, or table, as it may be termed. Each of said shafts is provided at its inner end with a crank 37, such crank carrying a wrist pin 38, that is connected with the table by being provided with a block 39, slidably held in a horizontally disposed slot or way 40 attached to the under side of the table. The connection between the two shafts is preferably by two gears 41, so that they rotate in opposite directions, and the disposition of the cranks on their inner ends is such that, in the raised position of the top, the blocks 39 will be thrown slightly over the centers, or axes, of the respective operating shafts; the table will thus be securely retained in such position, while at the same time the thrust of the two cranks, when in operation, is at all times symmetrical, since they are lowered and raised in unison.

To effect rotation of the shafts, one of the same is provided at its forward or outer end with a manually operable lever 42. Furthermore, I approximately counter-balance the weight of the parting-stand top by means of a coil spring 43 that encircles such handled shaft, one end of the spring being attached to the frame and the other to a head on the outer end of the shaft in which the lever or handle 42 is secured. Such spring, in resuming its normal position, tends to rotate the shaft in a proper direction to elevate the frame.

The inverted mold is not designed to be received directly upon the parting stand top 28 hereinbefore described, but upon a secondary top 44 carried thereby. Such secondary top is in the form of an open frame, or rather spider, comprising four radially extending arms, each of said arms being provided at its outer end with a downwardly projecting extension 45 fitted to correspondingly disposed apertures in the top 28 of the parting stand proper, and adjustably secured in said apertures by means of set screws 46 or equivalent clamping means. It will accordingly be obvious that the secondary top may be secured at varying elevations above the main top of the parting stand, in order to accommodate the latter to the reception of flasks of different depths, such as it has been explained the machine is designed to handle.

In order to support the mold in unchanged position while it is being freed from the pattern, adjustable means are provided on such secondary table to receive and support the bottom board of the flask. These means in the preferred form illustrated comprise a series of four vertically reciprocable pins or plungers 47 held in suitable pockets formed in the extensions above referred to, the latter being made tubular with this in view. Beneath each plunger is disposed a compression spring 48 adapted to normally retain the same in elevated position until it is brought into contact with the bottom of the rolled-over flask. Such pins are then adapted to be locked in the more or less depressed position, which they are thus forced to assume, by means of the oppositely disposed locking bars 49 of the general form clearly illustrated in Fig. 1. Each such bar, in other words, presents a flattened U-shape, its outer ends having a sufficient spread to respectively enter apertures in the sides of the pockets that receive a corresponding pair of reciprocable plungers, while rotatably mounted, intermediately between the inner portions of the bars, is a locking member 50 having a pair of oppositely disposed cam-faces which, upon rotation of such member respectively engage such locking bars to force the same outwardly and thus cause their extremities to press against the pins. Said cam-member is also provided with an integral handle or operating lever 51, the outer end of which lies clear of the secondary top in convenient reach of the operator.

While the coil-spring 43, as has been seen, is adapted to substantially counter-balance the weight of the parting stand including both the main and secondary top of such stand, it will be realized that, just as in the case of the carrier frame, the placing of the mold on said parting stand adds a relatively considerable weight; and it has been found that in lowering the mold from the pattern, unless the operator is careful, the lever, or other means, by which such lowering is accomplished will break away from him and in the consequent rapid descent of the table the mold will be irreparably damaged. I accordingly provide braking means in connection with the operating shafts 35, the function of such means in the parting operation being simply to control the descent of the parting stand. These means conveniently take the form of a flexible brake-band 52, of the form and position illustrated in Fig. 4, that is adapted to be drawn against friction-disks 53 upon the shafts by depressing a foot-lever or treadle 54. The amount of depression of the latter is limited by means of a stop 55 that is engaged thereby, and the tension placed on the brake-band may be adjusted for such limiting position of the treadle to exert any desired amount of friction, or in other words, to give any desired braking effect, by properly tightening or loosening the connection 56 between the band and treadle. Preferably the adjustment of such band will be such that the weight of the table and mold is not entirely counter-balanced, thus necessitating the operator to keep his hand upon the lever, but without requiring any particular exertion on his part, either to force such lever down or hold it against the weight of the parts just referred to.

The clamping means which are preferably used to secure the flask of the filled mold upon the carrier frame comprise a plurality of independent, hooked, L-shaped members 57 such as illustrated in Fig. 9 and shown in position in Fig. 2. The straight end of each member is threaded to receive a nut 58, on which in turn is pivoted a bifurcated handle 59 having cam faces that are adapted to engage with correspondingly bifurcated lugs 60 extending outwardly from the carrier frame. The mode of use of such clamps is as follows:—The hooked end is slipped over the bottom board at a point in alinement with one of the bifurcated lugs just referred to, the nut on the straight end of the member being adjusted so as to slip beneath such lug while the end in question fits between the two parts thereof. The handle, attached to the nut, is thereupon rocked to bring its cam faces against the lug parts, with the result that the clamping member is drawn down tightly against the bottom board. In place of such clamping means the more familiar bail 61 may be employed as shown in Fig. 1. In such case the inner ends of the bail will be attached, after the fashion illustrated in said figure, to blocks 62 on the ends of the carrier shaft which are extended for this purpose through their respective bearings in the standards of the frame.

The general mode of operation of my improved mold making machine should be readily understandable from the description already given of the operation of its several parts and particularly that of the oscillatory pattern holder or carrier frame and that of the parting stand. Depending upon the initial adjustment of such stand which is effected by securing the secondary top of the same a greater or less distance above the main top or table proper, such stand may be accommodated to the reception of molds of varying depths. No adjustment of course in the carrier frame is necessary for such different depths of mold; but it will be desirable to have the main operative spring under less tension when handling a light mold than when handling a heavy mold and vice versa. This adjustment I readily secure by means of the set bolt 27. Irrespective, however, of the tension or power thus available for turning over the pattern holder, it will be remembered that such power is held inactive by the latch 19 until such time as it is desired to use it. Thus the main spring may be put under sufficient tension to not only materially assist in the rocking over and inversion of the mold, but to actually effect such rocking over without any exertion on the part of the operator.

The arrangement of the resilient connections including such main spring and the vertically disposed springs which are alternately brought into operation in positions of the pattern holder on opposite sides of a vertical passing through its axis of oscillation is such that the downward movement of the holder with the attached mold, in order to lower the latter onto the parting stand, is restrained just as the elevation of such parts in the initial stage of the operation was assisted.

Attention is finally called to the improvements in the construction of the parting stand whereby the latter is perfectly balanced upon the raising and lowering means irrespective of the vertical position of such stand, thus eliminating any tendency to bind, either in the guides or supports of the stand. The braking means associated with the mechanism thus provided for raising and lowering said stand constitute yet an additional feature of improvement whereby the lowering of the stand may be satisfactorily accomplished by a single workman even where the mold is one of relatively considerable weight. Not only is it possible thus to handle molds of a variety of sizes but also molds of considerably greater weight than has been the case heretofore with machines of the type in hand; and all this is accomplished with less exertion on the part of the operator, or operators, than in the case of prevailing types of manually operated rockover machines.

Other modes of applying the principle of my invention may be employed instead of the one explained, change being made as regards the mechanism herein disclosed, provided the means stated by any of the following claims or the equivalent of such stated means be employed.

I therefore particularly point out and distinctly claim as my invention:—

1. In a machine of the character described, the combination of an oscillatorily supported pattern carrier adapted to extend horizontally in opposite directions; resilient means tending to raise said carrier from either such position; and other means adapted to engage with said resilient means to render the same inoperative.

2. In a machine of the character described, the combination of an oscillatorily supported pattern carrier adapted to extend horizontally in opposite directions; springs connected with said carrier and adapted to raise the same from either such position; and a latch adapted to engage with said springs and render the same inoperative.

3. In a machine of the character described, the combination of an oscillatorily supported pattern carrier adapted to extend horizontally in opposite directions; two sets of means tending to raise said carrier from either such position; and other means adapted to render one set of such first-named means inoperative.

4. In a machine of the character described, the combination of an oscillatorily supported pattern carrier adapted to extend horizontally in opposite directions; two sets of resilient means tending to raise said carrier from either such position, one set substantially counter-balancing said carrier in unloaded condition and the two sets combined substantially counter-balancing the same in loaded condition; and other means adapted to render the second set of said resilient means inoperative.

5. In a machine of the character described, the combination of an oscillatorily supported pattern carrier adapted to extend horizontally in opposite directions; two sets of springs connected with said carrier and adapted to raise the same from either such position, one set substantially counter-balancing said carrier in unloaded condition and the two sets combined substantially counter-balancing the same in loaded condition; and a latch adapted to engage with the second set of said springs and render the same inoperative.

6. In a machine of the character described, the combination of an oscillatorily supported pattern carrier adapted to extend horizontally in opposite directions; two sets of resilient means tending to raise said carrier from either such position, one set comprising paired means respectively adapted substantially to counter-balance said carrier when unloaded, on opposite sides of a vertical through its axis of oscillation, and the two sets combined substantially counter-balancing said carrier, when loaded, on either side of such vertical; and other means adapted to render the second set of said resilient means inoperative.

7. In a machine of the character described, the combination of an oscillatorily supported pattern carrier adapted to extend horizontally in opposite directions; two sets of springs connected with said carrier and adapted to raise the same from either such position, one set comprising paired springs respectively adapted substantially to counter-balance said carrier, when unloaded, on opposite sides of its axis of oscillation, and the two sets combined substantially counter-balancing said carrier when loaded, on either side of such vertical; and a latch adapted to engage with the second set of said springs and render the same inoperative.

8. In a machine of the class described, the combination of an oscillatorily supported pattern carrier adapted to extend horizontally in opposite directions; a vertically reciprocable member connected with said carrier to oscillate the same; and resilient means tending to reciprocate said member.

9. In a machine of the class described, the combination of an oscillatorily supported pattern carrier adapted to extend horizontally in opposite directions; a vertically reciprocable member connected with said carrier; a tension spring tending to reciprocate said member; and means adapted to render said spring inoperative.

10. In a machine of the class described, the combination of an oscillatorily supported pattern carrier adapted to extend horizontally in opposite directions; a vertically reciprocable cross-head; resilient connections between said cross-head and carrier, whereby the latter is oscillated upon movement of the former; and means adapted to move said cross-head.

11. In a machine of the class described, the combination of an oscillatorily supported pattern carrier adapted to extend horizontally in opposite directions; a vertically reciprocable cross-head; a tension spring connecting said cross-head and carrier, whereby the latter is oscillated upon movement of the former; means limiting the tension thus placed on said spring; and means adapted to move said cross-head.

12. In a machine of the class described, the combination of an oscillatorily supported pattern carrier adapted to extend horizontally in opposite directions; a vertically reciprocable cross-head; a tension spring connecting said cross-head and carrier, whereby the latter is oscillated upon movement of the former; a rod also connecting said cross-head and carrier, and permitting only limited relative movement therebetween, whereby the tension placed on said spring is limited; and means adapted to move said cross-head.

13. In a machine of the class described, the combination of an oscillatorily supported pattern carrier adapted to extend horizontally in opposite directions; a vertically reciprocable cross-head; a member oscillatory about the same axis as said carrier and having a limited movement relatively to the latter; and means connecting said cross-head and member, whereby the latter is oscillated upon movement of the former.

14. In a machine of the class described, the combination of an oscillatorily supported pattern carrier adapted to extend horizontally in opposite directions; a vertically reciprocable cross-head; a member oscillatory about the same axis as said carrier and having a limited movement relatively to the latter; resilient connections between said cross-head and member whereby the latter is oscillated upon movement of the former; and means adapted to move said cross-head.

15. In a machine of the class described, the combination of an oscillatorily supported pattern carrier adapted to extend horizontally in opposite directions; a vertically reciprocable cross-head; a member oscillatory about the same axis as said carrier and having a limited movement relatively to the latter; a tension spring connecting said cross-head and member, whereby the latter is oscillated upon movement of the former; a rod also connecting said cross-head and member, but permitting limited relative movement therebetween, whereby the tension placed on said spring is limited; and means adapted to move said cross-head.

16. In a machine of the class described, the combination of an oscillatorily supported pattern carrier adapted to extend horizontally in opposite directions; a vertically reciprocable cross-head; two members oscillatory about the same axis as said carrier and having a limited movement relatively to the latter; and means connecting said cross-head with said members, respectively, but at points relatively angularly spaced about their common axis.

17. In a machine of the class described, the combination of an oscillatorily supported pattern carrier adapted to extend horizontally in opposite directions; a vertically reciprocable cross-head; two members oscillatory about the same axis as said carrier and having a limited movement relatively to the latter; resilient connections between said cross-head and members, respectively, said connections being attached to said members at points relatively angularly spaced about their common axis; and means adapted to move said cross-head.

18. In a machine of the class described, the combination of an oscillatorily supported pattern carrier adapted to extend horizontally in opposite directions; a vertically reciprocable cross-head; two members oscillatory about the same axis as said carrier and having a limited movement relatively to the latter; tension springs connecting said cross-head and members, respectively, said springs being connected with said members at points relatively angularly spaced about their common axis; rods, respectively associated with said springs, also connecting said cross-head and members and permitting only limited relative movement therebetween, whereby the tension placed on said springs is limited; and means adapted to move said cross-head.

19. In a machine of the class described, the combination of an oscillatorily supported pattern carrier adapted to extend horizontally in opposite directions; a vertically reciprocable cross-head; connections between said cross-head and carrier, whereby the latter is oscillated upon movement of the former; means tending to depress said cross-head; and other means adapted to render said last-named means inoperative.

20. In a machine of the class described, the combination of an oscillatorily supported pattern carrier adapted to extend horizontally in opposite directions; a vertically reciprocable cross-head; resilient connections between said cross-head and carrier whereby the latter is oscillated upon movement of the former; a rocker engaging with said cross-head; resilient means connected with said rocker and tending to operate the same to depress said cross-head; and a latch adapted to render said resilient means inoperative.

21. In a machine of the class described, the combination of an oscillatorily supported pattern carrier adapted to extend horizontally in opposite directions; a vertically reciprocable cross-head; a tension spring connecting said cross-head and carrier, whereby the latter is oscillated upon movement of the former; means limiting the tension thus placed on said spring; another tension spring adapted to depress said cross-head; and a latch adapted to engage said cross-head to prevent such depression and thus render said last-named spring inoperative.

22. In a machine of the class described, the combination of an oscillatorily supported pattern carrier adapted to extend horizontally in opposite directions; a vertically reciprocable cross-head; a tension spring connecting said cross-head and carrier, whereby the latter is oscillated upon movement of the former; a rod also connecting said cross-head and carrier, and permitting only limited relative movement therebetween, whereby the tension placed on said spring is limited; a rocker engaging with said cross-head; a tension spring connected with said rocker and tending to operate the same to depress said cross-head; and a latch adapted to engage said cross-head to prevent such depression and thus render said last-named spring inoperative.

23. In a machine of the class described, the combination of an oscillatorily supported pattern carrier adapted to extend horizontally in opposite directions; a vertically reciprocable cross-head; a member oscillatory about the same axis as said carrier and having a limited movement relatively to the latter, means connecting said cross-head and member, whereby the latter is oscillated upon movement of the former; means tending to depress said cross-head; and other means adapted to render said last-named means inoperative.

24. In a machine of the class described, the combination of an oscillatorily supported pattern carrier adapted to extend horizontally in opposite directions; a vertically reciprocable cross-head; a member oscillatory about the same axis as said carrier and having a limited movement relatively to the latter; resilient connections between said cross-head and member, whereby the latter is oscillated upon movement of the former; a rocker engaging with said cross-head; resilient means connected with said rocker and tending to operate the same to depress said cross-head; and a latch adapted to render said resilient means inoperative.

25. In a machine of the class described, the combination of an oscillatorily supported pattern carrier adapted to extend horizontally in opposite directions; a vertically reciprocable cross-head; a member oscillatory about the same axis as said carrier and having a limited movement relatively to the latter; a tension spring connecting said cross-head and member, whereby the latter is oscillated upon movement of the former; means limiting the tension thus placed on said spring; another tension spring adapted to depress said cross-head; and a latch adapted to engage said cross-head to prevent such depression and thus render said last-named spring inoperative.

26. In a machine of the class described, the combination of an oscillatorily supported pattern carrier adapted to extend horizontally in opposite directions; a vertically reciprocable cross-head; two members oscillatory about the same axis as said carrier and having a limited movement relatively to the latter; means connecting said cross-head with said members, respectively, but at points relatively angularly spaced about their common axis; other means tending to depress said cross-head; and means adapted to render said last-named means inoperative.

27. In a machine of the class described, the combination of an oscillatorily supported pattern carrier adapted to extend horizontally in opposite directions; a vertically reciprocable cross-head; two members oscillatory about the same axis as said carrier and having a limited movement relatively to the latter; resilient connections between said cross-head and members, respectively, said connections being attached to said members at points relatively angularly spaced about their common axis; a rocker engaging with said cross-head; resilient means connected with said rocker and tending to operate the same to depress said cross-head; and a latch adapted to render said resilient means inoperative.

28. In a machine of the class described, the combination of an oscillatorily supported pattern carrier adapted to extend horizontally in opposite directions; a vertically reciprocable cross-head; two members oscillatory about the same axis as said carrier and having a limited movement relatively to the latter; tension springs connecting said cross-head and members, respectively, said springs being connected with said members at points relatively angularly spaced about their common axis; rods, respectively associated with said springs, also connecting said cross-head and members and permitting only limited relative movement therebetween, whereby the tension placed on said springs is limited; a rocker engaging with said cross-head; another tension spring connected with said rocker and tending to operate the same to depress said cross-head; and a latch adapted to engage said crosshead to prevent such depression and thus render said last-named spring inoperative.

Signed by me this 23d day of November, 1910.

GEORGE A. McKEEL.

Attested by—
 ANNA L. GILL,
 JNO. F. OBERLIN.

Copies of this patent may be obtained for five cents each, by addressing the "Commissioner of Patents, Washington, D. C."